United States Patent
Zapata et al.

(10) Patent No.: US 6,576,874 B2
(45) Date of Patent: Jun. 10, 2003

(54) MODULAR HEATING ELEMENT FOR A CONVEYOR OVEN

(75) Inventors: David Zapata, Dallas, TX (US); Charles Kingdon, Flower Mound, TX (US); John Gilleland, Arlington, TX (US)

(73) Assignee: Bakers Pride, Dallas, TX (US)

( * ) Notice: Subject to any disclaimer, the term of this patent is extended or adjusted under 35 U.S.C. 154(b) by 0 days.

(21) Appl. No.: 09/947,720

(22) Filed: Sep. 6, 2001

(65) Prior Publication Data

US 2003/0042244 A1 Mar. 6, 2003

(51) Int. Cl.[7] ............... F27B 9/10; F27B 9/36; A21B 1/26; A21B 1/48
(52) U.S. Cl. ............... 219/400; 219/388; 219/403
(58) Field of Search ............... 219/400, 403, 219/388, 520, 536, 537; 34/543, 545, 546, 549, 553, 554

(56) References Cited

U.S. PATENT DOCUMENTS

| | | | | |
|---|---|---|---|---|
| 1,878,522 A | * | 9/1932 | Ipsen et al. | 219/388 |
| 3,693,452 A | * | 9/1972 | McGinley et al. | 219/388 |
| 3,727,601 A | * | 4/1973 | Klement | 219/400 |
| 3,908,533 A | * | 9/1975 | Fagerstrom et al. | 219/388 |
| 3,985,946 A | * | 10/1976 | Werych | 373/128 |
| 4,154,861 A | * | 5/1979 | Smith | 219/388 |
| 4,276,465 A | * | 6/1981 | Flavio | 219/388 |
| 4,322,605 A | * | 3/1982 | Stimens | 219/388 |
| 4,406,944 A | * | 9/1983 | Crain et al. | 219/388 |
| 4,565,704 A | * | 1/1986 | Dagerskog et al. | 219/388 |
| 4,591,333 A | * | 5/1986 | Henke | 219/388 |
| 4,908,488 A | * | 3/1990 | Park | 219/400 |
| 4,965,435 A | * | 10/1990 | Smith et al. | 219/388 |
| 4,980,797 A | * | 12/1990 | Blomgren, Jr. | 219/388 |
| 5,142,795 A | * | 9/1992 | Abbott | 219/388 |

\* cited by examiner

*Primary Examiner*—Joseph Pelham
(74) *Attorney, Agent, or Firm*—Gardere Wynne Sewell LLP

(57) ABSTRACT

A modular heater for a conveyor oven has a flange that is removably attachable to the conveyor oven. The flange has an interior surface and an exterior surface. A heating element is attached to the interior surface of the flange. At least one contact is attached to the exterior surface of the flange. The contact is electrically connected to the heating element.

16 Claims, 4 Drawing Sheets

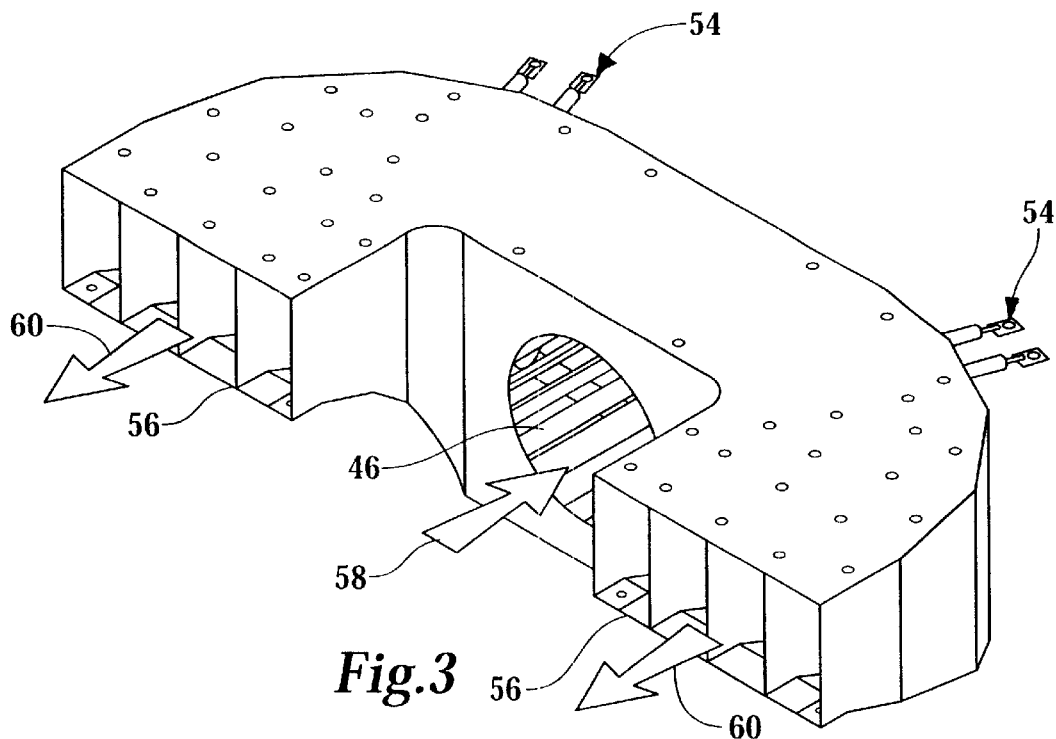
*Fig.3*
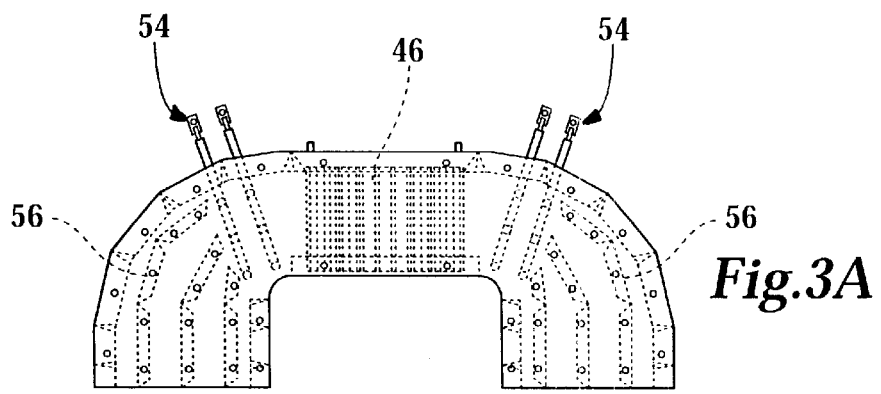
*Fig.3A*
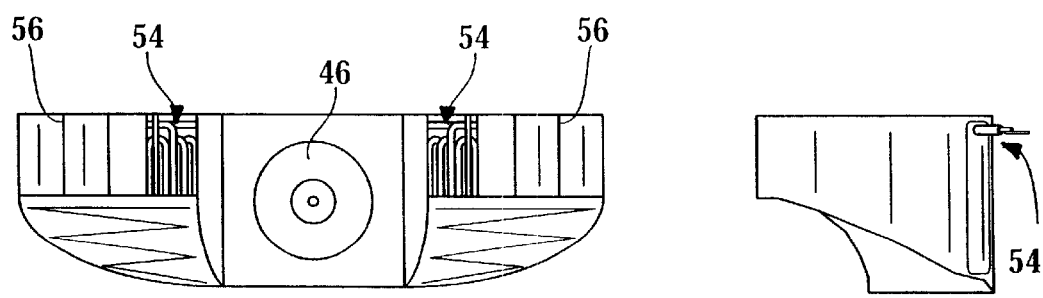
*Fig.3B*   *Fig.3C*

MODULAR HEATING ELEMENT FOR A CONVEYOR OVEN

FIELD OF THE INVENTION

The present invention relates to conveyor ovens and, more particularly to, an conveyor oven having modular heating elements that may be easily replaced and independently controlled to modify the cooking characteristics of the conveyor oven.

BACKGROUND OF THE INVENTION

Many restaurants use conveyor ovens to prepare food. Conveyor ovens typically cook or heat food by forced convection. A food service professional may place food such as a pizza or a dish of lasagna, for example, on the conveyor and the food is cooked or heated as it is conveyed through heated air within the oven.

Air within the oven may be heated by resistive electrical heating elements located within the oven. Often, the heating elements are located inside ductwork in the inner structure of the oven. A fan or blower may force air through the ductwork. The air is consequently heated to a desired cooking temperature as it flows over the heating elements.

Typical heating elements however, are difficult to repair or replace because they are located within ductwork inside the oven. Consequently, repairs and maintenance are time-consuming and expensive. A restaurant may lose additional money because a broken oven cannot cook meals for customers.

Another limitation of conventional ovens is the ability, to upgrade heating elements. If newer, more efficient heating elements are developed, owners of conventional ovens may be required to have their outdated oven rebuilt at considerable cost. In some cases, an oven may not have the potential for upgrades because of space limitations or incompatible circuitry. The outdated oven may require replacement for the owner to have the desired features.

Additionally, conventional ovens have only a single resistive heating element having one temperature control. Supplying this typical resistive heating element with electricity will heat oven air to one particular temperature. Some foods however, may require different temperatures to properly cook different regions of the food. Pizza, for example, may require a hotter temperature air to properly cook a crisp crust while the top of the pizza may require a cooler temperature air to avoid burning a cheese topping. An oven having only a single temperature is not capable of cooking foods according to the desires of some food service professionals. Although a rheostat may be used to control the degree to which the heating element heats the air, controlling the temperature of air within different zones of the oven is difficult or impossible using conventional ovens having only one heating element.

It would, therefore, be desirable to have an improved heating element that is not difficult to replace or repair. It would also be desirable to have an improved heating element that is not difficult or impossible to upgrade. Further, it would be desirable to have an improved heating element in a conveyor oven that does not have the heating and cooking limitations of conventional conveyor ovens.

SUMMARY OF THE INVENTION

The present invention is a modular heater for a conveyor oven that has a flange that is removably attachable to the conveyor oven. The flange has an interior surface and an exterior surface. A heating element is attached to the interior surface of the flange. At least one contact is attached to the exterior surface of the flange. The contact is electrically connected to the heating element.

In one embodiment of the invention, a conveyor oven has a housing. The housing has an upper end and a lower end. A base has a first end and a second end, the first end of the base is attached to the lower end of the housing. A top has a first end and a second end, the first end of the base is attached to the upper end of the housing. The top extends generally parallel and adjacent to the base. The volume between the base and the top generally defines an oven chamber. A blower distributes air to the oven chamber and a modular heater heats the air distributed in the oven chamber.

In another embodiment of the invention, a food preparation system has a conveyor oven that has a cooking chamber. A blower distributes air to the cooking chamber and a heating element module to heat the air distributed by the blower.

BRIEF DESCRIPTION OF THE DRAWINGS

For a more complete understanding of the present invention, including its features and advantages, reference is now made to the detailed description of the invention, taken in conjunction with the accompanying drawings of which:

FIG. 3 is a cut-away view of a plenum housing that depicts an embodiment of the present invention;

FIGS. 3A–3C are principal axis views of the plenum assembly of FIG. 3; and

DETAILED DESCRIPTION OF THE INVENTION

Figure 1:
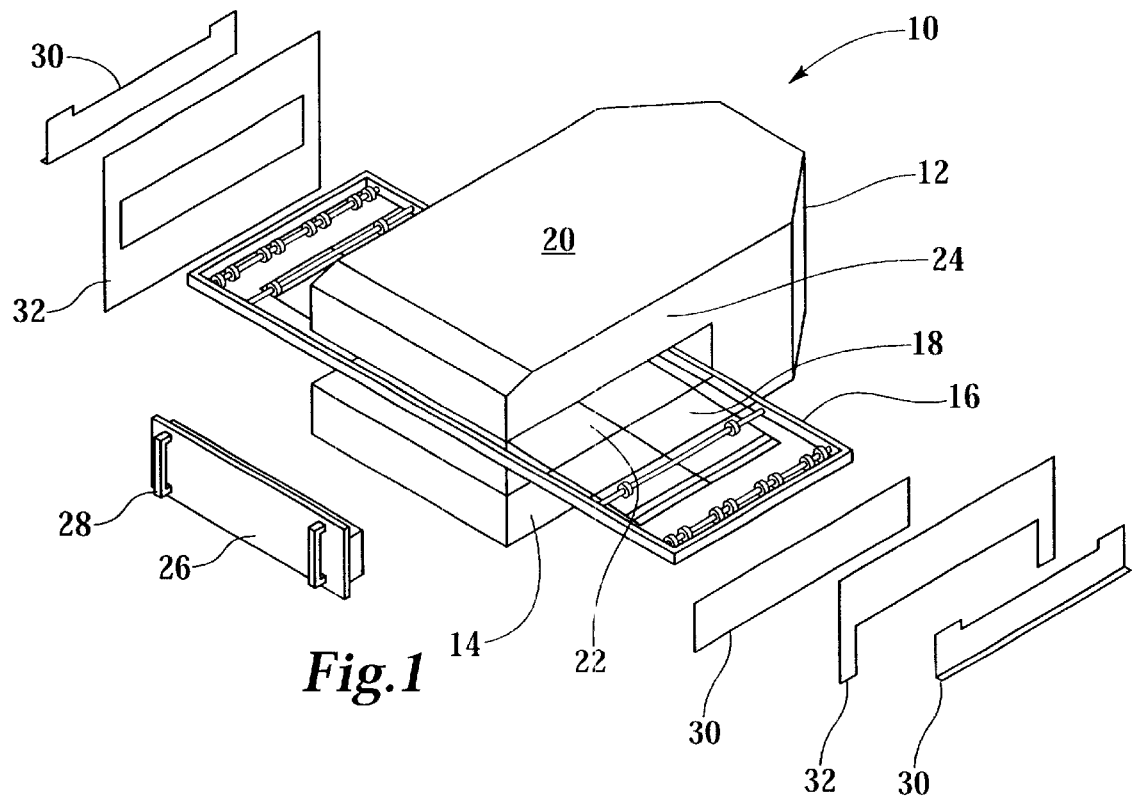
FIG. 1 is an exploded perspective view of a conveyor oven that depicts an embodiment of the present invention.
Figure 1A:
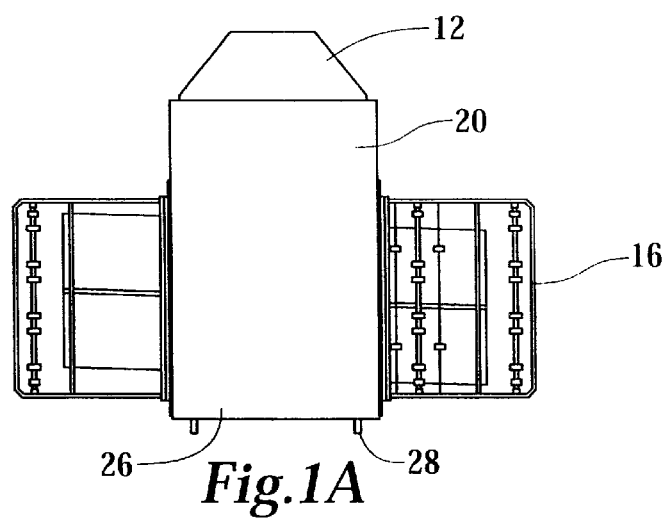
FIGS. 1A–1C are principal axis views of the conveyor oven of FIG. 1.
Figure 1B:
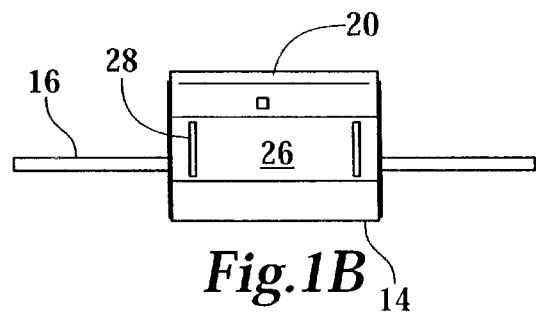
Figure 1C:
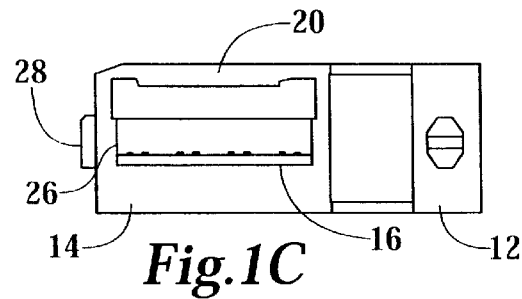
Figure 2:
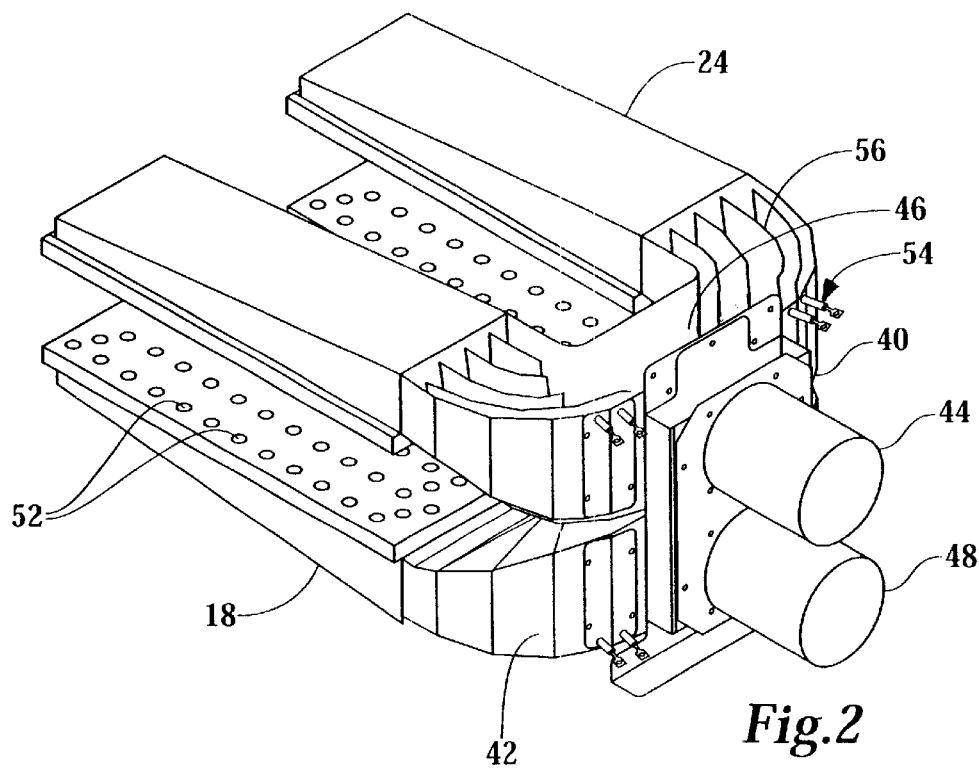
FIG. 2 is perspective view of a plenum assembly that depicts an embodiment of the present invention.
Figure 2A:
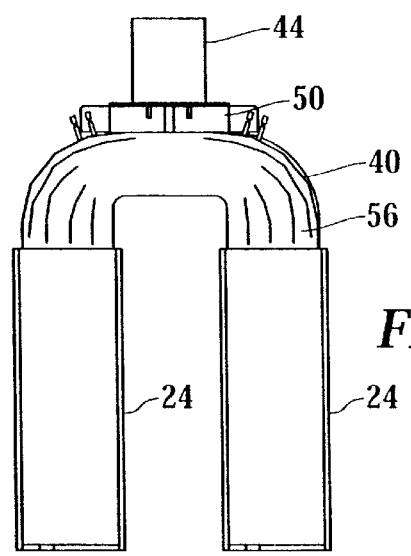
FIGS. 2A–2C are principal axis views of the plenum assembly of FIG. 2.
Figure 2B:
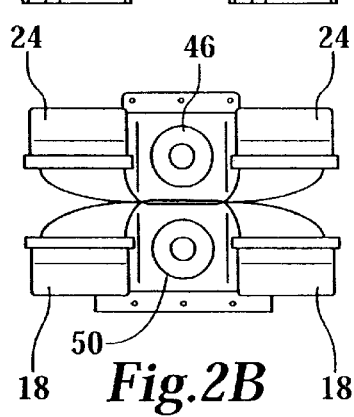
Figure 2C:
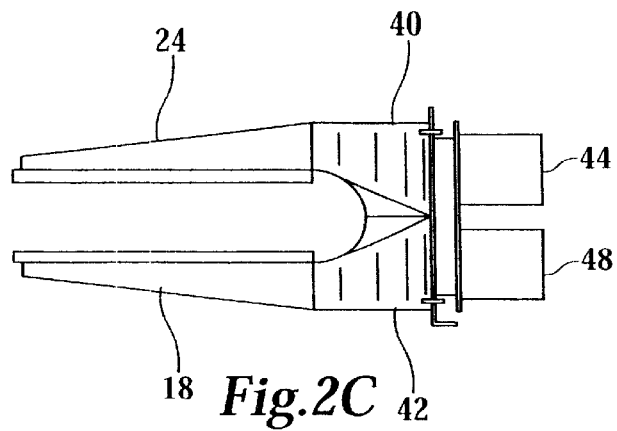

While the making and using of various embodiments of the present invention is discussed in detail below, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

A heating element according to one embodiment of the present invention has many useful advantages over heating elements in a typical conveyor oven. Typical conveyor ovens have a heating element that is usually difficult to access for repair and if maintenance. Also, upgrading the heating element may be difficult or, impossible depending on space limitations of the oven or the configuration of a particular heating element. A heating element according to one embodiment of the present invention is contained in an easily accessible modular unit. The heating element may be easily replaced or upgraded by simply plugging a new heating element module into the existing cavity. An improved heating element according to one embodiment of the present invention will be described in more detail below.

As depicted in FIG. 1 and FIGS. 1A–1C, an oven 10 has a housing 12. The housing 12 may house various components of the oven 10 such as plenum housings, heating elements, blowers, a power supply, switches, motors and the like. The housing 12 may be fabricated from stainless steel or other suitable material such as aluminum or carbon fiber. The housing 12 may be formed by a brake or fabricated from multiple pieces and bolted, screwed or welded together. The housing 12 may rest directly on a countertop or table or may have adjustable feet (not shown) to compensate for uneven surfaces.

A base 14 is attached to the lower portion of the housing 12. The base 14 may be welded, bolted or screwed to the housing 12. Similar to the housing 12, the base 14 may also be fabricated from stainless steel, aluminum or other suitable material for the food service industry. The base 14 may impart additional stability to the oven 10 by distributing the weight of the oven 10 over a larger area. The dimensions of the base 14 will generally define the size of the oven 10. Smaller capacity ovens 10 will usually have a smaller base 14, whereas larger capacity ovens 10 will usually have a larger base 14.

The base 14 provides support for a conveyor 16. The conveyor 16 may be a wire mesh that conveys food through the oven 10. A motor within the housing 12 typically drives the conveyor 16 but the conveyor 16 may also be driven by an external drive or other drivethat is housed within the conveyor 16. Alternate methods of driving the conveyor 16 will be apparent to those having ordinary skill in the art of conveyor ovens.

The base 14 may also support one or more lower plenums 18. The lower plenums 18 deliver heated air or gasses to the lower side of a food that is cooked in the oven 10. The lower plenums 18 may be fabricated from stainless steel, aluminum, molded plastic or other material that is suitable to channel heated air or gasses. The lower plenums 18 may simply rest on the base 14 or interlock into the base 14, the housing 12, or a plenum housing (described below). The lower plenums 18 may be easily removable from the oven 10 to facilitate cleaning and maintaining the oven 10. The lower plenums 18 will be described in greater detail below.

A top 20 is attached to an upper portion of the housing 12. The top 20 may be fabricated from materials such as stainless steel, aluminum or other materials known in the art of oven manufacturing. The size of the top 20 may have dimensions similar to the dimensions of the base 14. The volume of space between the base 14 and the top 20 generally defines a chamber 22 of the oven 10. The size of the chamber 22 determines the size of the conveyor 16 and ultimately determines the size or amount of food that may be cooked in the oven 10 during a particular time. Different sizes of ovens 10 may be manufactured by varying the lengths and widths of the top 20 and base 14 and varying the distance between the top 20 and the base 14.

One or more baffles 30 may be removably attached to the top 20 or other portion of the oven 10 to contain and redirect heated air or gasses within the chamber 22. The baffles 30 may help prevent heated air or gasses from escaping through the entrance or exit of the oven 10, and thereby improve the efficiency of the oven 10 and the environment of a user. The baffles 30 may be removed from the oven 10 to facilitate cleaning the chamber 22. One or more side covers 32 may also be removably attached to the top 20 or other portion of the oven 10. The side covers 32 may be insulated to help protect users from injuries caused by hot surfaces on the oven 10.

The top 20 may support one or more upper plenums 24. The upper plenums 24 deliver heated air or gasses to the upper side of food that is cooked in the oven 10. The upper plenums 24 may also deliver heated air or gasses to the chamber 22 to thoroughly cook the entire food rather than cook only a particular region of the food, such as the top of a pizza, for example. The upper plenums 24 may be fabricated from stainless steel, aluminum, molded plastic or other material that is suitable to channel heated air or gasses. The upper plenums 24 may interlock into the top 20, the housing 12, or the plenum housing (described below). The upper plenum 24 may be easily removable from the oven 10 to facilitate cleaning and maintaining the oven 10.

Referring now to FIG. 2 and FIGS. 2A–2C, a plenum assembly includes an upper plenum housing 40 and a lower plenum housing 42. An upper motor 44 within the upper plenum housing 40 drives an upper blower 46. Similarly, a lower blower motor 48 drives a lower blower 50. Separate motors 44, 48 may be independently controlled to differentiate airflow between the upper plenum 24 and the lower plenum 18. Independently controlled airflow allows a user to more, precisely control the cooking process. For example, more air, at a higher temperature, may be directed to the, through the lower plenum 18 to most effectively cook and crisp the crust of a pizza. During the same cooking process, less air, at a lower temperature, may be directed through the upper plenum 24 to properly heat pizza toppings and melt cheese on the pizza. If the same temperature air were directed to both upper and lower surfaces of the pizza, the crust could be undercooked or the cheese could be burned.

The blowers 46, 50 within the housing 12 may force the heated air or gasses into the plenums 18, 24. The plenums 18, 24 may be tapered towards their distal ends to maintain air or gas velocity along the length of the plenums 18, 24. The heated air or gasses may be discharged from the plenums 18, 24 through a series of distribution ports 52 in the lower surface of the upper plenum 24 and the upper surface of the lower plenum 18. The series of distribution ports 52 may be sized and arranged to deliver an appropriate volume of heated air or gasses and properly cook food within the oven 10. Heated air or gasses from the upper plenum 24 may be directed to impinge on the upper surface of the food while heated air or gasses from the lower plenum 18 may be directed to impinge on the lower surface of the food. This directional distribution of heated air or gasses aids in cooking separate portions of foods such as the meat or cheese toppings on a pizza, for example.

Turning now to FIG. 3 and FIGS. 3A–3C, a cutaway view of the upper plenum housing 40 is depicted in detail. Although the upper plenum housing 40 is depicted, the lower plenum housing 42 functions in a similar manner and both upper and lower components will be discussed with reference to FIG. 3. The blowers 46, 50 may draw air from the oven chamber 22 as shown generally by arrow 58. Upon starting the oven 10, ambient air will be drawn through the entrance and exit of the oven 10 into the blowers 46, 50. The air may then be distributed into the plenum housings 40, 42. The plenum housings 40, 42 have a heating element module 54 within the air path to heat air that is moved by the blowers 46, 50. The heating element module 54 may heat the air by electrical resistance, combustion, or infrared heating, for example. Other components to heat the air within the oven 10 will be apparent to those having ordinary skill in oven design.

Each branch of the plenum housings 40, 42 may have a separate heating element module 54. Each heating element module 54 may be independently controlled to deliver different temperature air to different regions of the chamber 22. For example, in an oven 10 that has front and rear branches of the plenums 18, 24, air to each of the branches of the plenums 18, 24 may be heated to a different temperature according to the cooking characteristics of a particular food. Consequently, different temperature air may be directed to different regions of the chamber 22.

Additionally, the heating element modules 54 and the speed of the blowers 46, 50 may be simultaneously controlled by a computer processor (not shown) to more precisely control the temperature profile of the chamber 22. A series of thermocouples (not shown) placed within the chamber 22 may monitor the oven temperature in real time. The computer processor may compare the information from the thermocouples to a desired temperature profile and adjust the output of the blowers 46, 50 and the heating element modules 54 accordingly. At any given time, individual blowers 46, 50 and heating element modules 54 may be controlled to operate in a range from completely off to maximum output. This ability to independently control the output of the blowers 46, 50 and the heating element modules 54 allows a user of the oven 10 to have complete control of the temperature profile within the chamber 22. Other methods of controlling the temperature profile within the chamber 22 will be apparent to those having ordinary skill in control theory.

After the air is forced over the heating element module 54, the air continues to flow through the plenum housings 40, 42 and is delivered to the plenums 18, 24. Arrows 60 generally designate this airflow from the plenum housings 40, 42. The airflow may be collimated by a series of vanes 56 within the plenum housings 40, 42. The vanes 56 may be thin strips of metal, plastic, or other suitable material that are spot welded, screwed, glued or otherwise fastened in the flow path of the air. The vanes 56 are designed to redirect, distribute and equalize airflow across the cross section of the plenum housings 40, 42 and the plenums 18, 24. Collimated air is more efficiently delivered through the plenums 18, 24 and, consequently, into the chamber through the distribution ports 52. As a result, the vanes 56 alter airflow characteristics to improve heat distribution within the chamber 22.

Heated air circulates within the chamber 22 and cooks or heats the food on the conveyor 16. Because the blowers 46, 50 draw air from the chamber 22, the blowers 46, 50 draw heated air after the oven 10 has been operating for a period of time and the heating element modules 54 impart additional heat to the air. If the heating element modules 54 and the blowers 46, 50 are operated at a steady rate, the temperature within the chamber 22 will eventually reach a steady state. However, varying environmental conditions such as room temperature changes and the addition of cold food products to the chamber 22 will alter the temperature profile of the chamber 22. Independent and variably controllable heating element modules 54 may add or reduce heating to compensate for changes in a proper temperature profile. Consequently, food may be properly cooked in a consistent manner.

Figure 4:
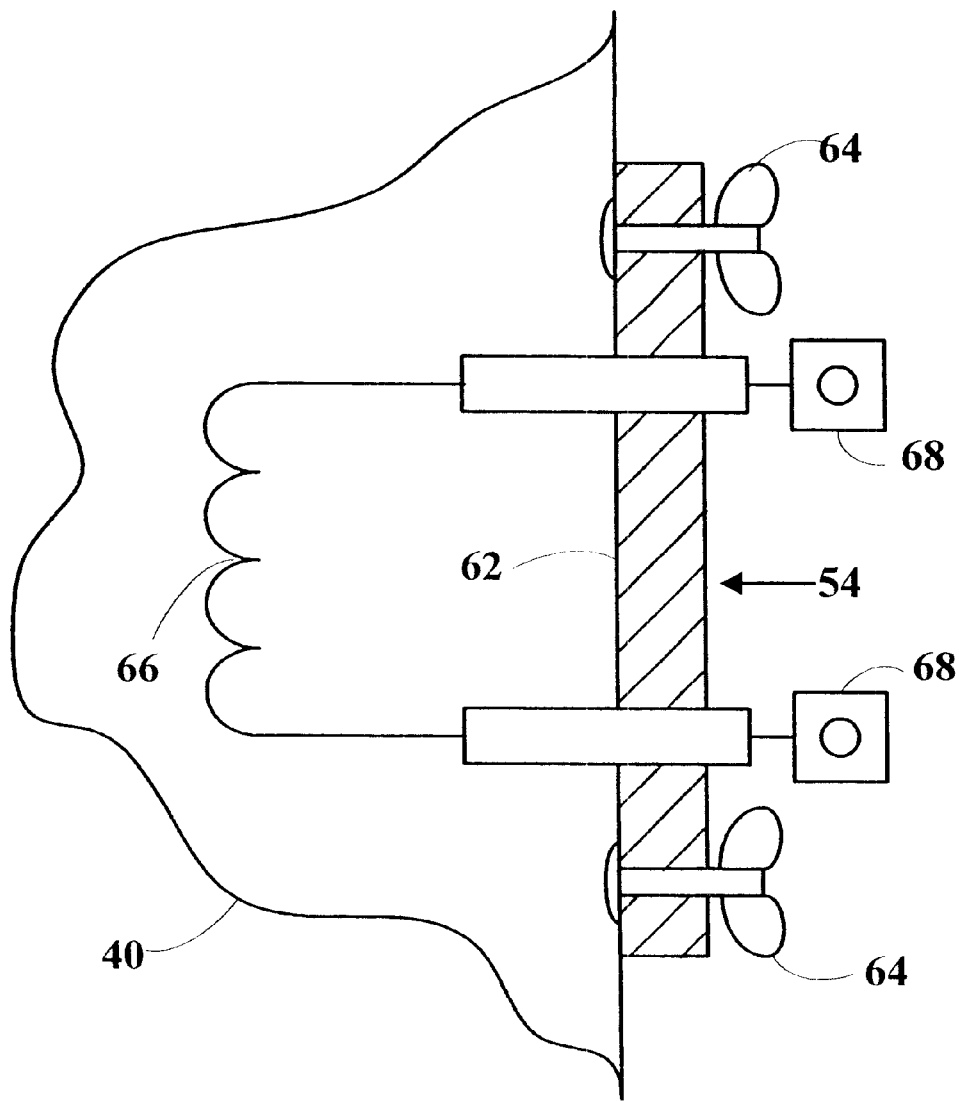
FIG. 4 is a schematic diagram that depicts an embodiment of the present invention.

Turning now to FIG. 4, the heating element module 54 is depicted in greater detail. The heating element module 54 has a flange 62 that may be releasably attached to the plenum housing 40, 42 by fasteners 64. The fasteners 64 may be thumbscrews, wing nuts, or other removable fasteners known in the art. The heating element module 54 may also be removably attached to the plenum housing 40, 42 by an interference or friction-type fit or spring-loaded lug. Other methods of removably attaching the heating element module 54 to the plenum housing 40, 42 will be apparent to those having ordinary skill in the art of fastening components.

An element 66 is attached to the inside of the flange 62. The element 66 is positioned within the airflow path of the plenum housing 40, 42 to heat air that is moved by the blower 46, 50. Electrical contacts 68 are attached to the outside of flange 62. A power source (not shown) from the oven 10 is attached to the contacts 68, which deliver heating power to the element 66. For example, if the heating element module 54 has an electric element 66, electricity from the power source is delivered to the contacts 68, which resistively heats the element 66. Heat from the element 66, in turn, heats air that flows over the element 66.

The heating element module 54 may be easily replaced or upgraded because it is removable from the plenum housing 40, 42. The heating element module 54 may be removed by simply pulling the heating element module 54 from the plenum housing 40, 42 if the heating element module 54 has an interference fit or by unfastening and removing the heating element module 54 if the heating element module is attached with fasteners. This easily replaceable feature is advantageous because a damaged element 66 may be quickly replaced without losing valuable time. The time that the oven 10 is out of service is reduced significantly.

Additionally, the oven 10 may be upgraded if new, more efficient heating elements are developed. The new element 66 may be added to a heating element module 54, which may be swapped for an outdated heating element module 54. For example, a heating element module may have a supplemental element 66 to impart additional heat to the oven. The upgrade is quick and easy because the heating element modules have a standard size and interface with the oven 10. Therefore upgrades do not require expensive modifications and retrofitting to the oven 10.

Another advantage of the heating element module 54 is that different heating element modules 54 may be installed in an oven. Although the dimensions and interfaces with the oven 10 may be the same, the power output may be different for heating element modules 54. For example, heating element modules 54 in the lower plenum housing 42 may have a higher power output to more thoroughly cook the lower portion of a food while the heating element modules 54 in the upper plenum housing 40 may have a lower power output to reduce the likelihood that the top of the food will be burned. Heating element modules 54 having different characteristics may be arranged in a variety of configurations within the oven 10 to provide great flexibility in controlling the temperature profile within the chamber 22.

Whereas the invention has been shown and described in connection with the preferred embodiment thereof, it will be understood that many modifications, substitutions and additions may be,made which are within the intended broad scope of the appended claims. There has therefore been shown and described an improved heating element that accomplishes at least all of the above stated advantages.

What is claimed is:

1. A modular heater for a conveyor oven comprising:
   a flange having an interior surface and an exterior surface, the flange removably attachable to the conveyor oven;
   a heating element attached to the interior surface of the flange;
   at least one contact attached to the exterior surface of the flange and electrically connected to the heating element.

2. The modular heater of claim 1 wherein the flange is removably attachable to the conveyor oven such that the heating element is in an airflow path within the conveyor oven.

3. The modular heater of claim 1 wherein the at least one contact is removably attachable to a power source.

4. The modular heater of claim 1 further comprising a supplemental heating element to impart additional heat to the oven.

5. The modular heater of claim 1 wherein the flange is removably attachable to the conveyor oven by thumbscrews.

6. The modular heater of claim 1 wherein the flange is removably attachable to the conveyor oven by an interference fit between the flange and a socket in the conveyor oven.

7. The modular heater of claim 1 further comprising one or more vanes attached to the interior surface of the flange to direct airflow over the heating element.

8. The modular heater of claim 1 further comprising a rheostat connected to the heating element to control the amount of heat produced by the heating element.

9. A conveyor oven comprising:
    a housing having an upper end and a lower end;
    a base having a first end and a second end, the first end of the base attached to the lower end of the housing;
    a top having a first end and a second end, the first end of the base attached to the upper end of the housing, the top extending generally parallel and adjacent to the base;
    an oven chamber, the oven chamber generally defined by the volume between the base and the top;
    a plenum, disposed at least partly within the oven chamber and having a plenum housing having an opening therein;
    a blower to distribute air to the oven chamber through the plenum; and
    a heating element module extending through the plenum housing, the removable heating element module having a flange conformed to the opening in the plenum housing and a heating element extending into the plenum to heat the air distributed in the plenum.

10. The conveyor oven of claim 9 further comprising one or more additional plenums to direct the air from the blower to one or more regions of the oven chamber.

11. The conveyor oven of claim 10 further comprising one or more additional heating element modules associated with each of the one or more additional plenums to heat the air directed by the one or more additional plenums.

12. The conveyor oven of claim 9 further comprising a second heating element module and wherein the heating element modules are individually controllable.

13. A food preparation system comprising:
    a conveyor oven having a cooking chamber;
    a plenum, having a plenum housing, disposed at least partly in the cooking chamber;
    a plenum housing opening, disposed in the plenum housing;
    a blower to distribute air to the cooking chamber at least partly through the plenum; and
    a removable heating element module extending through the plenum housing, the removable heating element module having a flange conformed to the opening in the plenum housing and a heating element extending into the plenum to heat the air distributed by the blower through the plenum.

14. The system of claim 13 further comprising one or more additional plenums to direct the air from the blower to one or more regions of the cooking chamber.

15. The system of claim 14 further comprising one or more heating element modules associated with each of the one or more additional plenums to heat the air directed by the one or more plenums.

16. The system of claim 15 wherein the one or more heating element modules are individually controllable.

* * * * *